(12) United States Patent
Kim

(10) Patent No.: US 11,832,748 B2
(45) Date of Patent: Dec. 5, 2023

(54) PET (POLYETHYLENE TEREPHTHALATE) COATED WIRE HANGER AND APPARATUS AND METHOD OF MANUFACTURING THE SAME

(71) Applicant: Hak Su Kim, Gyeonggi-do (KR)

(72) Inventor: Hak Su Kim, Gyeonggi-do (KR)

( * ) Notice: Subject to any disclaimer, the term of this patent is extended or adjusted under 35 U.S.C. 154(b) by 582 days.

(21) Appl. No.: 17/111,954

(22) Filed: Dec. 4, 2020

(65) Prior Publication Data

US 2022/0142387 A1 May 12, 2022

(30) Foreign Application Priority Data

Nov. 6, 2020 (KR) ................. 10-2020-0147527

(51) Int. Cl.
| | |
|---|---|
| *A47G 25/24* | (2006.01) |
| *A47G 25/36* | (2006.01) |
| *B29C 48/79* | (2019.01) |
| *B29C 48/154* | (2019.01) |
| *B29C 48/88* | (2019.01) |
| *B29K 67/00* | (2006.01) |
| *B29L 31/00* | (2006.01) |

(52) U.S. Cl.
CPC ............ *A47G 25/24* (2013.01); *A47G 25/36* (2013.01); *B29C 48/154* (2019.02); *B29C 48/79* (2019.02); *B29C 48/911* (2019.02); *B29C 48/919* (2019.02); *B29K 2067/003* (2013.01); *B29L 2031/735* (2013.01)

(58) Field of Classification Search
CPC ............ A47G 25/24; A47G 2025/1485; A47G 2025/1492; B29C 48/154; B29C 48/79; B29C 48/919; B29K 2067/003; B29K 2067/00; B29L 203/735

See application file for complete search history.

(56) References Cited

U.S. PATENT DOCUMENTS 4,588,546 A * 5/1986 Feil ................. H01B 3/441
264/510
5,806,727 A * 9/1998 Joseph ............... A47G 25/32
223/92

(Continued)

FOREIGN PATENT DOCUMENTS

| KR | 200406818 Y1 | 1/2006 |
| KR | 100993496 B1 | 11/2010 |

(Continued)

*Primary Examiner* — Ismael Izaguirre
(74) *Attorney, Agent, or Firm* — Kim IP Law Group LLC

(57) ABSTRACT

The present invention discloses a PET-coated wire for a hanger wherein the wire is coated with PET to form a PET coating having a thickness of 0.03 to 0.05 mm, and a hanger made of the wire. The PET coating apparatus for a wire used for a hanger of the present invention comprises a preheating device 20 for preheating the cleaned wire 10 to 220 to 250° C., an extruder 30 and a dice 40 for coating the preheated wire 10 with PET to form a PET coating having a thickness of 0.03 to 0.05 mm, a cooling bath 50 for cooling the PET-coated wire 100, and a winding device 60 for drawing out and winding the cooled wire. The cooling bath 50 of the present invention is designed such that the wire passes through the cooling bath 50 having a length of 5 m three times for sufficient cooling when the wire proceeds at a high speed of 220 to 300 m/min.

10 Claims, 4 Drawing Sheets

(56) References Cited

U.S. PATENT DOCUMENTS

| | | | | | |
|---|---|---|---|---|---|
| 6,006,964 | A | * | 12/1999 | White | A47G 25/743 |
| | | | | | 223/85 |
| 2007/0164061 | A1 | * | 7/2007 | Carter | A47G 25/32 |
| | | | | | 223/85 |
| 2011/0123811 | A1 | * | 5/2011 | Clerck | A47G 25/26 |
| | | | | | 428/425.5 |

FOREIGN PATENT DOCUMENTS

| | | | | | |
|---|---|---|---|---|---|
| WO | WO-0036177 | A1 | * | 6/2000 | B05D 5/067 |
| WO | WO-2007054457 | A1 | * | 5/2007 | D07B 1/148 |

\* cited by examiner

PET (POLYETHYLENE TEREPHTHALATE) COATED WIRE HANGER AND APPARATUS AND METHOD OF MANUFACTURING THE SAME

CROSS-REFERENCE TO RELATED APPLICATIONS

This application claims foreign priority to Korean Patent Application No. 10-2020-0147527 filed on Nov. 6, 2020, the disclosure of which is hereby incorporated by reference in its entirety for all purposes.

TECHNICAL FIELD

The present invention relates to a hanger. More specifically, the present invention relates to a wire hanger used in dry cleaners, a wire for hangers coated with PET resin, and a manufacturing apparatus thereof.

BACKGROUND

Hangers are manufactured in various shapes with a variety of materials and are used in dry cleaners, homes, and offices. Wire hangers are used in dry cleaners, and the present invention relates to a wire hanger coated with PET and a manufacturing apparatus thereof. The 'hanger' described herein refers to a wire hanger.

Hangers are manufactured by coating a wire having a diameter of 2.0 to 2.5 mm, preferably 2.2 mm, with polypropylene (PP) resin. The hangers are largely divided into two types according to the manufacturing method: polypropylene (PP) coated hangers, and paint-coated (powder coating) hangers.

For PP coated hangers, the wire is first coated with PP before the hanger is manufactured. Then, the PP-coated wire is continuously fed into the hanger manufacturing machine to manufacture the hanger. In order to manufacture the PP-coated hangers, two-step process is used; coating the wire with PP, and manufacturing the hangers from the coated wire.

The manufacturing process of paint-coated hanger consists of two steps: manufacturing the hanger by continuously feeding the uncoated wire into a hanger manufacturing machine, and applying paint to the manufactured hanger. The main component of the paint used in this case is also PP. The inventor of the present invention have developed a paint-coating device for hangers that is capable of automatically and continuously paint-coating the hanger manufactured from the wire hanger manufacturing device, and was granted Korean Patent No. 993496 (application filed on Jun. 20, 2008).

Since all conventional hangers manufactured by the PP coating method or the paint coating (powder coating) method use PP as a raw material, there are several limitations in the properties of the hanger. Nevertheless, other resins such as PE (polyethylene), PET (polyester), PVC (polyvinyl chloride) cannot be used for hangers because these resins are not suitable for hangers, or relevant technology has not been developed sufficiently.

The thickness of the coating on the PP-coated hanger is at least 0.4 mm. If the coating thickness less than 0.4 mm, the coating might fail to form in certain places, and thus the minimum thickness of 0.4 mm must be maintained.

The strength of the hanger increases as resin is applied to the wire as a coating. However, even if the PP resin is applied with a thickness of 0.4 mm, it does not contribute much to improving the strength.

Protective clothing (e.g. gowns) for medical personnel such as doctors and nurses, or uniforms for companies or factories, need to be sterilized after washing. The sterilization is usually performed in a sterilization room of 200° C. or higher, and in this case, the hangers are put into the sterilization room together with the laundry. Since PP melts at 180° C., PP-coated hangers cannot be used for laundry that needs to be sterilized.

The galvanized hanger was developed as a hanger that can be used in a sterilization room. The galvanized hangers can be used in a sterilization room above 200° C. without a problem, except for the possibility of zinc corrosion. When zinc is corroded, white powder is generated on the coating film, and when it comes into contact with laundry, the laundry will be stained black. Therefore, even the galvanized hangers still have problems.

The present inventor came to develop a hanger coated with PET (polyethylene terephthalate: polyester). Since PET has a melting point of 270° C., it can be used in sterilization rooms of 200° C. or higher without any problems. Also, since PET has more strength than PP, the strength of hangers is further improved. Since the thickness of the PET coating film can be applied in the range of 0.03 to 0.05 mm according to present invention, required amount of raw material can be reduced to about 1/10 of raw material used in the conventional PP coating method.

The hangers can also be manufactured by injection or extrusion of synthetic resin. Korean Utility Model Registration No. 406818 discloses water-soluble fragrances or pigments mixed with polypropylene, polyethylene, or other plastic polymer for the hanger to emit fragrance until the end of the lifespan of the hanger. However, this particular type of hanger is substantially different from the wire hanger of the present invention.

SUMMARY OF THE INVENTION

Objectives of the Invention

An objective of the present invention is to provide a hanger coated with PET (polyethylene terephthalate: polyester).

Another objective of the present invention is to provide a hanger that can be used in a sterilization room of 200° C. or more by coating the hanger with PET.

Another objective of the present invention is to provide a hanger capable of minimizing environmental pollution by forming a thin PET coating having a thickness in the range of 0.03 to 0.05 mm.

Another objective of the present invention is to provide a hanger having a better strength than a PP-coated hanger, even with the thinner PET coating having a thickness in the range of 0.03 to 0.05 mm.

Another objective of the present invention is to provide a hanger capable of reducing required amount of raw material to 1/10 of the amount used in the conventional PP-coating method by forming a thinner PET coating having a thickness in the range of 0.03 to 0.05 mm.

Another objective of the present invention is to provide a hanger without any parts or places on the hanger where the coating is peeled off or only partially coated even with the thin PET coating having a thickness in the range of 0.03 to 0.05 mm due to great coating adhesion Another objective of the present invention is to provide a novel apparatus capable of coating a wire for a hanger with PET such that the PET coating has a thickness of 0.03 to 0.05 mm.

Another objective of the present invention is to provide a method of coating a wire for a hanger with PET.

All of the aforementioned and other objectives of the present invention can be achieved by the present invention described in detail below.

Technical Solutions

The PET-coated hanger of the present invention is characterized by being made of PET-coated wire, wherein the wire has a diameter of 2.0 to 2.5 mm, preferably 2.2 mm, and is coated with PET such that the PET coating with a thickness of 0.03 to 0.05 mm is formed.

The PET coating device for coating the wire for the hanger with PET according to the present invention comprises a preheating device 20 for preheating a cleaned wire 10 with a diameter of 2.0 to 2.5 mm to 220 to 250° C.; an extruder 30 and dice 40 for coating the preheated wire 10 with PET to form a PET coating with a thickness of 0.03 to 0.05 mm; a cooling bath 50 for cooling the PET-coated wire 100; and a winding device 60 for drawing out and winding the cooled wire.

Since PET has a melting point of about 270° C., the wire 10 must be preheated in the temperature range of 220 to 250° C. If it is not preheated to the temperature in this range, the coating procedure will not proceed smoothly, and the coating may peel off after the coating procedure.

The PET-coated wire 100 must undergo a sufficient cooling process. If a sufficient cooling is not performed, there will be a problem of coating peeling off after the coating procedure. In the present invention, a cooling bath 50 specially designed for sufficient cooling of the PET-coated wire 100 is used. In the apparatus for coating the wire 10 having a diameter of 2.0 to 2.5 mm, the wire usually proceeds at a high speed of 220 to 300 m/min. The present inventor has discovered that when the wire proceeds at such a high speed, in order to sufficiently cool the wire 100 that has been preheated in the temperature range of 220 to 250° C. and then coated with molten PET at about 270° C., the wire 100 needs to be passed through water at room temperature for about 15 m. In terms of the cooling time, this converts to about 3 seconds. That is, when the wire proceeds at a high speed of 220 to 300 m/min, in order to sufficiently cool the PET-coated wire 100, it must pass through water at room temperature for about 15 m. This means that the length of the cooling bath 50 should be 15 m. Therefore, according to the present invention, the cooling bath 50 is designed such that the wire passes through the 5 m long cooling bath 50 three times.

The PET-coated wire for the hanger according to the present invention is manufactured by following steps: preheating a cleaned wire 10 having a diameter of 2.0 to 2.5 mm, preferably 2.2 mm, to about 220 to 250° C.; forming a PET coating, wherein the preheated wire 10 is passed through a dice 40 where melted PET is extruded to form a PET coating having a thickness of 0.03 to 0.05 mm; cooling the PET-coated wire 100 in a cooling bath where 15 to 25° C. water circulates; and winding the cooled PET-coated wire 100 using the winding device 60 to draw out and wind the wire 100. The wire 100 wound in a roll is fed into a hanger manufacturing machine to manufacture the hanger.

Hereinafter, the present invention will be described in detail with reference to the accompanying drawings.

DETAILED DESCRIPTION OF THE EMBODIMENTS OF THE INVENTION

The present invention relates to a wire hanger used in dry cleaners, more specifically to a wire coated with PET resin to manufacture a PET-coated hanger and a coating apparatus thereof.

The PET-coated hanger of the present invention is characterized by forming a PET coating having a thickness of 0.03 to 0.05 mm on a wire having a diameter of 2.0 to 2.5 mm, preferably 2.2 mm.

Figure 1:
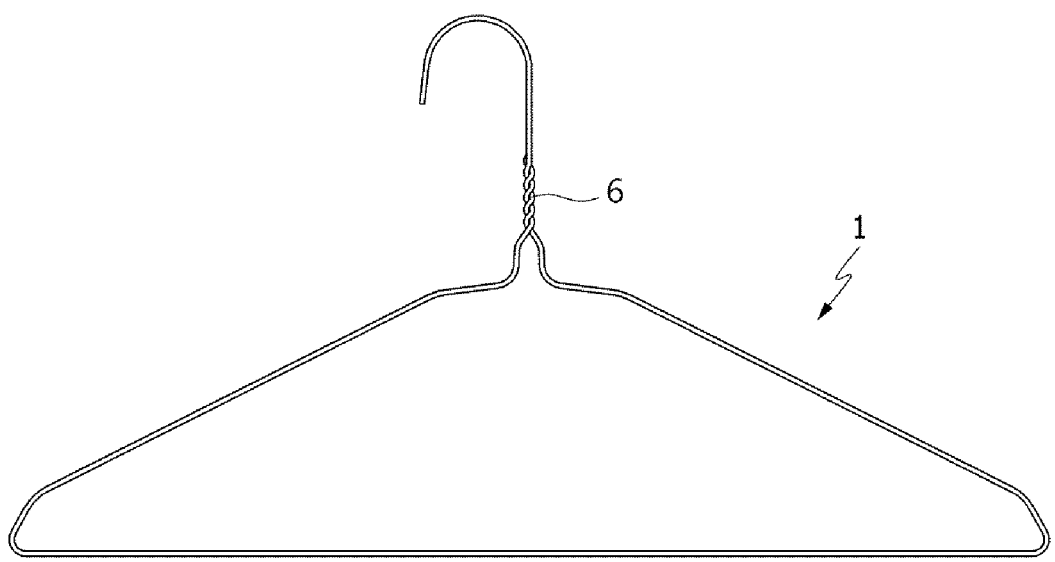
FIG. 1 is a schematic perspective view of a PET-coated hanger according to the present invention.

FIG. 1 is a schematic perspective view of a PET-coated hanger 1 according to the present invention. The hanger 1 is manufactured by continuously supplying a wire coated with PET to a hanger manufacturing apparatus. This hanger manufacturing apparatus is an automated apparatus that produces approximately one hanger per second, and is widely used in the hanger manufacturing field.

The wire coating apparatus for PET-coated hangers of the present invention is a device for forming a PET coating film having a thickness of 0.03 to 0.05 mm by coating a cleaned wire 10 having a diameter of 2.0 to 2.5 mm with PET resin.

Figure 2:
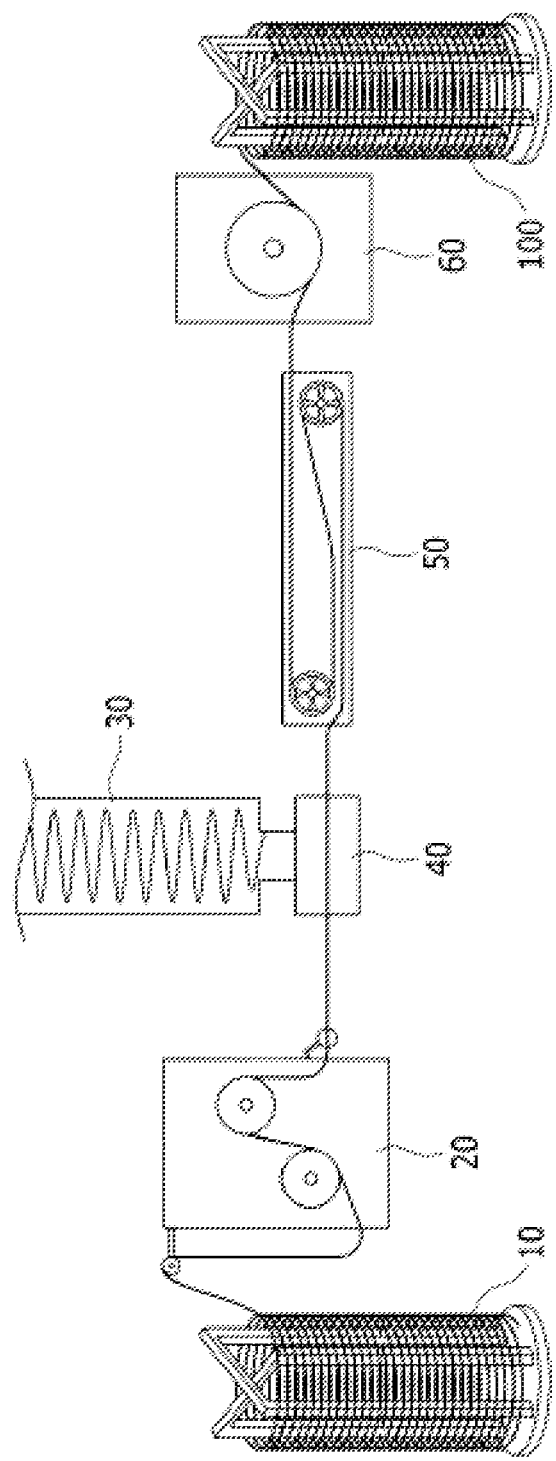
FIG. 2 is a schematic configuration diagram of a coating apparatus for coating a wire for a PET-coated hanger according to the present invention.

FIG. 2 is a schematic configuration diagram of a coating apparatus for coating a wire for a hanger with PET according to the present invention.

As illustrated in FIG. 2, the PET coating device for coating a wire for the hanger of the present invention comprises a preheating device 20 for preheating a cleaned wire 10 having a diameter of 2.0 to 2.5 mm to 220 to 250° C.; an extruder 30 and dice 40 for coating the preheated wire 10 with PET to form a PET coating having a thickness of 0.03 to 0.05 mm; a cooling bath 50 for cooling the PET-coated wire 100; and a winding device 60 for drawing out and winding the cooled wire.

Since PET has a melting point of about 270° C., the wire 10 must be preheated in the range of 220 to 250° C. If it is not preheated to this temperature range, the coating procedure does not proceed smoothly, and the coating may peel off after the coating procedure.

The preheating device 20 is a known device used to coat a wire with resin, wherein the wire is instantaneously preheated in the preheating device 20. Since the wire 10 is supplied at a high speed of 220 to 300 m/min, the wire 10 is preheated in the temperature range of 220 to 250° C. as the wire 10 passes through the preheating device 20 instantaneously. Preheating methods include inverter method, induction method, high frequency method and the like, and such preheating methods can be easily implemented by a person having ordinary skill in the art.

Figure 3:
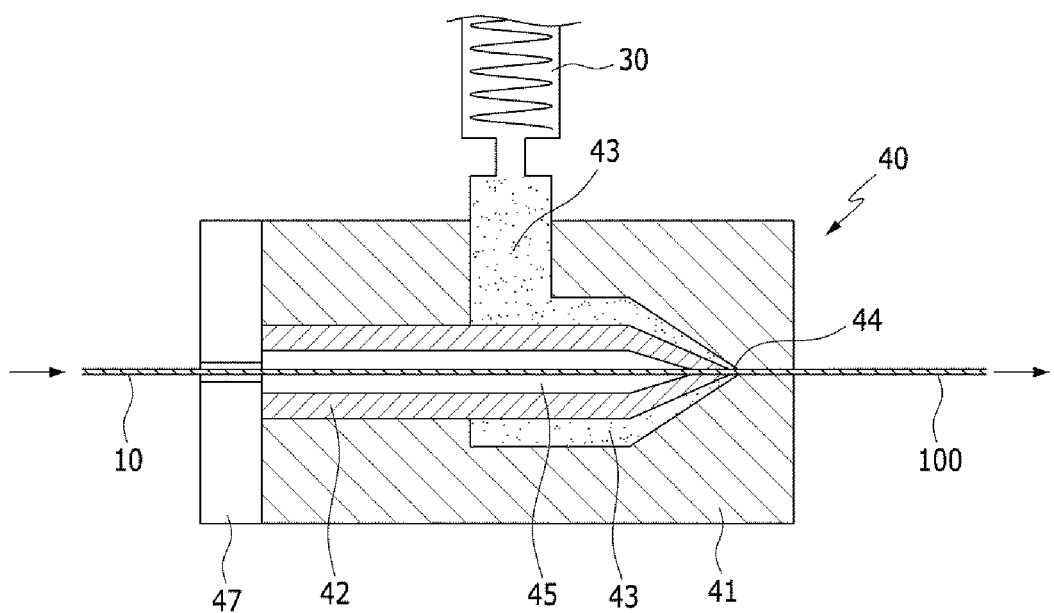
FIG. 3 is a schematic cross-sectional view showing the structure of the extruder 30 and the dice 40 for coating the wire 10 with PET resin.

The preheated wire 10 passes through a dice 40 where the molten PET is extruded by the extruder 30 to form a PET coating with a thickness of 0.03 to 0.05 mm FIG. 3 is a schematic cross-sectional view showing the structure of the extruder 30 and the dice 40 for coating the wire 10 with PET resin.

As illustrated in FIG. 3, the dice 40 is composed of an outer member 41 and an inner member 42, and these two members 41, 42 are fixed to a housing 47, and an extruder 30 is assembled on one side to allow the molten resin 43 to flow into the intermediate space 43. Within the inner member 42, a cylindrical inner space 45 is formed in the center such that the wire 10 can pass through, and an intermediate space 43 is formed between the outer member 41 and the inner member 42 where and a molten PET resin 43 flows in to fill it. At the end of the inner member 42, an annular slit 44 is formed by the outer member 41, through which the molten PET resin is ejected, and the ejected resin coats the surface of the wire 10 passing through.

The size of the slit 44 should be designed to facilitate the PET coating to form with a thickness of 0.03 to 0.05 mm on the wire 10. Preferably, a PET coating film with a thickness of 0.04 mm is formed. The operating principle of the dice 40 used in the present invention is similar to that of a dice which coats an electric wire, but it is important to design it such that a thin PET coating having a thickness of 0.03 to 0.05 mm is formed.

The PET-coated wire 100 must undergo a sufficient cooling process. If a sufficient cooling is not performed, there will be a problem of the coating peeling off after the coating procedure. In the present invention, a cooling bath 50 specially designed for sufficient cooling of the PET-coated wire 100 is used.

Figure 4:
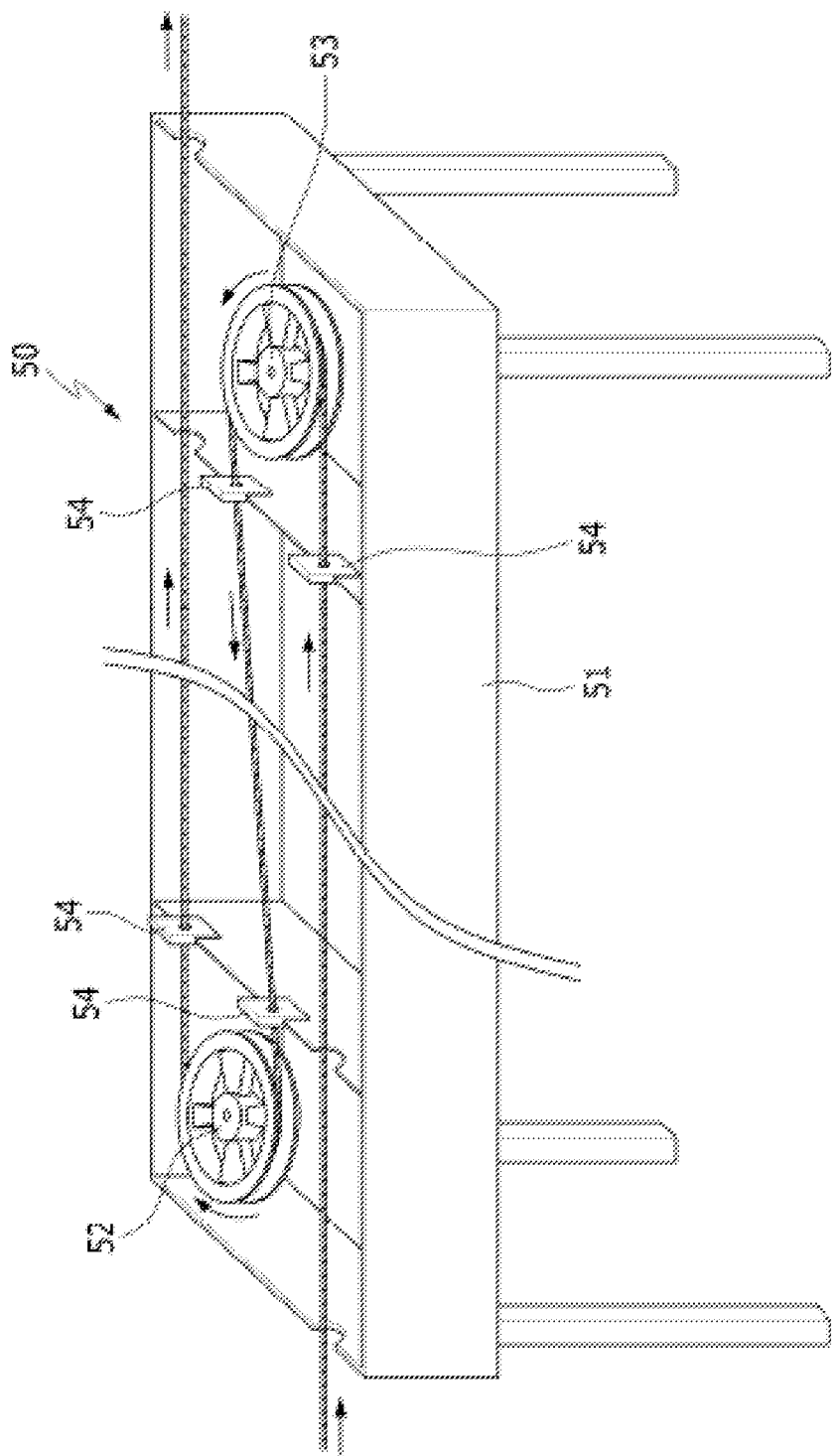
FIG. 4 is a schematic perspective view of a cooling bath 50 for cooling the wire 100 coated in the wire coating apparatus for PET-coated hanger according to the present invention.

FIG. 4 is a schematic perspective view of the cooling bath 50 in the wire coating apparatus for the PET-coated hanger according to the present invention.

The cooling bath 50 shown in FIG. 4 is actually an inner tank 51, which is located inside an external housing (not shown) to maintain submerged state. The cooling bath 50 of the present invention has a length of about 5 m, wherein the coated wire 100 enters the cooling bath 50 and is guided to the winding device 60 via wheels 52, 53. The wire 100 passing through the cooling bath 50 is guided by plurality of guides 54 and cooled while passing through the water.

The cooling bath 50 shown in FIG. 4 is designed such that a pair of wheels 52, 53 is installed to allow the wire 100 to pass through the length corresponding to three times the length of the cooling bath.

In the coating apparatus for the wire 10 with a diameter of 2.0 to 2.5 mm, the wire usually proceeds at a high speed of 220 to 300 m/min. When the wire proceeds at such a high speed, the wire 100 is preheated to the temperature range of 220 to 250° C., and in order to sufficiently cool the wire 100 coated with molten PET at about 270° C., the wire 100 needs to pass through the water at room temperature for about 15 m. This process takes about 3 seconds in terms of cooling time. That is, when the wire proceeds at a high speed of 220 to 300 m/min, in order to sufficiently cool the PET-coated wire 100, it must pass through the water at room temperature for about 15 m. This means that the length of the cooling bath 50 should be 15 m. Since the 15 m long cooling bath would occupy large area, the present invention designed a 5 m long cooling bath 50 such that coated wire 100 passes through the length of the cooling bath three times. As such, the space the device occupies can be efficiently utilized. While the length of the cooling bath 50 can be designed to be 3 m and have the wire pass through the cooling bath 50 5 times, it would require a larger power to draw out the wire, and therefore it is not desirable in view of energy saving or manufacturing cost.

Room temperature water is circulated in the cooling bath 50, because if the water in the cooling bath does not circulate, the temperature of the water rises and the cooling effect decreases. Room temperature water of 15 to 25° C. does not require additional energy because it does not need to be heated or cooled. If the temperature of the water in the cooling bath is set to be less than 15° C., for example 0° C., the cooling time may be further reduced, but it is not desirable due to unnecessary energy consumption water cooling requires.

The PET-coated wire 100 that has been cooled in the cooling bath 50 is wound up in a roll by a winding device 60. The winding device 60 winds up the wire 100 in a roll shape while drawing out the wire 100 using a coiler (not shown). The winding device 60 is a known device used to wind a wire, and can be easily implemented by a person of ordinary skill in the art.

The PET-coated wire 100 for the hanger according to the present invention is manufactured by following steps: preheating a wire 10 to about 220 to 250° C.; forming a PET coating film wherein the preheated wire 10 is passed through a dice 40 where melted PET is extruded to form a PET coating having a thickness of 0.03 to 0.05 mm; cooling the PET-coated wire 100 in a cooling bath where water at a temperature of 15 to 25° C. is circulated; and winding the cooled PET-coated wire 100 using the winding device 60 to draw out and wind the wire 100.

It is preferable to perform a pre-treatment step of drawing the wire with a diameter of 2.5 mm into a wire with a diameter of 2.2 mm and washing the wire simultaneously before the preheating step to remove contamination or rust formed on the surface of the wire.

The wire 100 wound in a roll is fed into a hanger manufacturing apparatus to manufacture the hanger. The hanger manufacturing apparatus is an automated apparatus that produces approximately one hanger per second.

One of the most important parts when manufacturing the hanger 1 from resin coated wire is the twisted part 6 where two strands of wire are twisted around each other, because the coating may peel off in the process of twisting two wires for the twisted part 6. If the coating is peeled off, the uncovered part will rust and rust may soil laundry, making the damaged hanger unusable. In the present invention, the wire is preheated to about 220 to 250° C., and the preheated wire is passed through a dice from which the molten PET is extruded to form a PET coating with a thickness of 0.03 to 0.05 mm, and then a sufficient cooling process is performed in order to manufacture a hanger which will not have any coating peeling off at the twisted part 6. After going through such process, the high quality of coating adhesion would be noticeable despite the thinness of the PET coating film.

Since the PET-coated hanger 10 of the present invention uses a PET resin having a melting point of 270° C., it can be used in a sterilization room of 200° C. or higher. In addition, since PET is stronger than PP, the strength of the hanger is further improved compared to the conventional PP-coated hanger. In the present invention, the amount of raw material required can be reduced to 1/10 of that of conventional PP-coating method in which the coating film of 0.4 mm thickness is formed, whereas the thickness of the PET coating can be applied in the range of 0.03 to 0.05 mm. As the amount of raw material required can be reduced, manufacturing costs can be reduced accordingly.

The present invention may be put into practice with simple modifications and variations by persons skilled in the art, and such modifications and variations are all within in the scope of the present invention.

| Explanation of the Numerals | |
| --- | --- |
| 1: hanger | 6: twisted part |
| 10: wire | 20: preheating device |
| 30: extruder | 40: dice |
| 50: cooling bath | 60: winding device |
| 100: PET-coated wire | 41: outer member |
| 42: inner member | 43: intermediate space (resin) |
| 44: slit | 45: inner space |
| 47: housing | 51: inner tank |
| 52, 53: wheel | 54: guide |

What is claimed is:

1. A PET coating apparatus for a wire used for a hanger comprising:
 a preheating device for preheating a cleaned wire having a diameter of 2.0 to 2.5 mm to 220 to 250° C.;
 an extruder and a dice for coating the preheated wire with PET to form a PET coating having a thickness of 0.03 to 0.05 mm;
 a cooling bath for cooling a PET-coated wire; and
 a winding device for drawing out and winding the cooled wire.

2. The PET coating apparatus for a wire used for a hanger according to claim 1, wherein the wire passes through the PET coating apparatus at a speed of 220 to 300 m/min.

3. The PET coating apparatus for a wire used for a hanger according to claim 2, wherein the preheating device preheats the wire by an inverter method, an induction method, or a high frequency method.

4. The PET coating apparatus for a wire used for a hanger according to claim 3, wherein the dice comprises an outer member and an inner member, these two members are fixed to a housing, the extruder is assembled on one side of the dice to allow molten resin flows into an intermediate space, a cylindrical inner space is formed at the center within the inner member such that the wire can pass through, and an annular slit is formed by the outer member at the end of the inner member, wherein the size of the slit is designed to form a PET coating having a thickness of 0.03 to 0.05 mm on the wire.

5. The PET coating apparatus for a wire used for a hanger according to claim 4, wherein the cooling bath is designed such that the supplied wire is guided by the wheels and a plurality of guides to pass through the length of the cooling bath three times.

6. The PET coating apparatus for a wire used for a hanger according to claim 5, wherein the water at the temperature of 15-25° C. circulated in the cooling bath.

7. A coating method for PET-coated wire used for a hanger, wherein the PET-coated wire is manufactured by following steps:
 preheating a cleaned wire having a diameter of 2.0-2.5 mm, to about 220 to 250° C.;
 forming a PET coating wherein the preheated wire passes through a dice where melted PET is extruded to form a PET coating film having a thickness of 0.03 to 0.05 mm;
 cooling the PET-coated wire in a cooling bath where the water at the temperature of 15 to 25° C. is circulated; and
 winding the cooled PET-coated wire using the winding device to draw out and wind the PET-coated wire.

8. The coating method for PET-coated wire used for a hanger according to claim 7, further comprising a pretreatment step of drawing the wire having a diameter of 2.5 mm into a wire having a diameter of 2.2 mm and washing the wire simultaneously before the preheating step.

9. The coating method for PET-coated wire used for a hanger according to claim 7, wherein the wire fed into the cooling bath in the cooling step is guided by wheels and a plurality of guides, and cooled by passing through the length of the cooling bath three times.

10. The coating method for PET-coated wire used for a hanger according to claim 8, wherein the wire fed into the cooling bath in the cooling step is guided by wheels and a plurality of guides, and cooled by passing through the length of the cooling bath three times.

\* \* \* \* \*